(12) United States Patent
Zapata et al.

(10) Patent No.: US 9,255,452 B2
(45) Date of Patent: Feb. 9, 2016

(54) FLUSH FITTING PIPE LINING SYSTEM

(71) Applicant: Robroy Industries, Inc., Verona, PA (US)

(72) Inventors: Oscar Zapata, White Oak, TX (US); Martin Bremner, Dubai (AE)

(73) Assignee: Robroy Industries, Inc., Verona, PA (US)

( * ) Notice: Subject to any disclaimer, the term of this patent is extended or adjusted under 35 U.S.C. 154(b) by 15 days.

(21) Appl. No.: 13/892,374

(22) Filed: May 13, 2013

(65) Prior Publication Data

US 2014/0333061 A1    Nov. 13, 2014

(51) Int. Cl.
| | |
|---|---|
| F16L 58/02 | (2006.01) |
| E21B 17/08 | (2006.01) |
| F16L 58/10 | (2006.01) |
| F16L 58/18 | (2006.01) |
| F16L 15/00 | (2006.01) |

(52) U.S. Cl.
CPC ............... *E21B 17/08* (2013.01); *F16L 15/001* (2013.01); *F16L 58/1036* (2013.01); *F16L 58/182* (2013.01)

(58) Field of Classification Search
USPC ......................................................... 285/55
See application file for complete search history.

(56) References Cited

U.S. PATENT DOCUMENTS

| | | | |
|---|---|---|---|
| 570,166 | A | 10/1896 | Greenfield |
| 1,909,075 | A | 5/1933 | Ricker et al. |
| 3,253,841 | A | 5/1966 | Ahmad |
| 3,298,716 | A | 1/1967 | Taylor et al. |
| 3,472,533 | A | 10/1969 | Turner |
| 3,479,059 | A | 11/1969 | Taylor et al. |
| 4,366,971 | A | 1/1983 | Lula |
| 4,509,776 | A | 4/1985 | Yoshida et al. |
| 5,069,485 | A | 12/1991 | Allen et al. |
| 5,282,652 | A | 2/1994 | Werner |
| 5,320,388 | A | 6/1994 | Lacy et al. |
| 6,036,235 | A | 3/2000 | Anderson et al. |
| 6,312,024 | B1 | 11/2001 | Dutilleul et al. |
| 7,360,797 | B2 | 4/2008 | Posson |
| 7,857,355 | B2 | 12/2010 | Zapata et al. |
| 7,909,368 | B2 | 3/2011 | Zapata |
| 2009/0167016 | A1 | 7/2009 | Zapata et al. |
| 2012/0248766 | A1 | 10/2012 | Schwalbach et al. |

FOREIGN PATENT DOCUMENTS

JP        06-017975 A      1/1994

*Primary Examiner* — David E Bochna
(74) *Attorney, Agent, or Firm* — The Webb Law Firm

(57) ABSTRACT

A liner assembly includes a first ring member, a second ring member, a corrosion barrier ring, a first liner, and a second liner. The first ring member includes a body member having a first end and a second end. The first end has a flange extending substantially perpendicularly therefrom. The second ring member includes a body member having a first end and a second end. The second end has a flange extending substantially perpendicularly therefrom. The body member of the first ring member extends along a face of the first liner a first distance beyond an inner diameter of the first liner. The body member of the second ring member extends along a face of the second liner a second distance beyond an inner diameter of the second liner.

20 Claims, 4 Drawing Sheets

FLUSH FITTING PIPE LINING SYSTEM

BACKGROUND OF THE INVENTION

1. Field of the Invention

The present invention relates to a coupling system utilized in connecting end-to-end lined pipe used in oil wells and the like, and, more particularly, to a lining system for use in a joint between two pipe segments and a method of connecting two unmodified pipe segments with a lining system which will prevent corrosion and maximize the inner diameter of the bore.

2. Description of Related Art

Many downhole oil-production operations are carried out in highly corrosive environments resulting from production and/or re-injection of hydrocarbons and formation of brinewaters containing salts and gases, such as hydrogen sulfide and carbon dioxide which can pass through the pipe interior.

To provide a useful life to the lengths of steel pipes that are used in such environments, corrosive resistant liners are installed within each pipe length before it is installed into the downhole string. Appropriate threaded coupling assemblies are required to connect the pipe in an end-to-end relationship. Coupling assemblies are also required to connect the internal liners that provide protection for the pipe and pipe threaded connection area against internal corrosion.

There are a large number of pipe end constructions and thread constructions employed by various pipe manufacturers to assure against fluid and gas leakage. Due to the presence of unique metal-to-metal torque shoulders and metal-to-metal seal areas, many of these pipe end and thread constructions known in the art require a custom built liner or coupling assembly unique to the pipe end and potentially even a custom pipe end thread design to accommodate an internal lining system.

One method known in the art utilizes an internal lining system that requires the insertion of a rigid plastic tube inside steel tubing and filling the annular space between the plastic tube and steel tubing with mortar. The inner rigid plastic tube, or liner, is capped or terminated at the end of the pipe with a flange, known as a "flare". The flare ends provide a surface area for compression of a bather ring, such as an elastomeric bather ring, in the coupling assembly.

An obstacle with insertion of such an assembly is that the threaded pipes or couplings need to be machined and threaded with special provisions to accommodate the lining process. This proves to be ineffective in time and cost as well as productivity.

Additionally, it has been discovered that such liner systems decrease the inner diameter of pipe and prevent tooling from easily traveling through the well bore. Still further, conventional liner systems also fail to adequately protect the liner face. This leads to liner strands being dislodged along the inner diameter of the liner, thereby negatively effecting product performance reliance.

In view of the foregoing, there is a need for a standardized or universal internal liner coupling assembly that can accommodate the wide variety of pipe end constructions currently in use without the need for special modifications to proprietary pipe end threads and couplings. A further need exists for a liner coupling assembly that maximizes the inner diameter of the lined pipe while also preventing strands of liner from dislodging along the inner diameter of the liner.

SUMMARY OF THE INVENTION

Accordingly, an object of the present invention is to provide a standardized or universal internal liner coupling assembly that can accommodate the wide variety of pipe end constructions currently in use without the need for special modifications to proprietary pipe end threads and couplings. In addition, a further object of the present invention is to provide a liner coupling assembly that maximizes the inner diameter of the lined pipe while also preventing strands of liner from dislodging along the inner diameter of the liner.

In accordance with one aspect of the present disclosure, provided is a liner assembly for use in a joint between two pipe segments. The liner assembly includes a first ring member, a second ring member, a corrosion barrier ring, a first liner, and a second liner. The first ring member includes a body member having a first end and a second end. The first end has a flange extending substantially perpendicularly therefrom. The second ring member includes a body member having a first end and a second end. The second end has a flange extending substantially perpendicularly therefrom. A corrosion barrier ring is disposed between and cooperates with the first end of the first ring member and the second end of the second ring member. The first liner has an inner diameter and a face that is positioned in contact with the first end of the body member of the first ring member. The second liner has an inner diameter and a face that is positioned in contact with the second end of the body member of the second ring member. The body member of the first ring member extends along the face of the first liner a first distance beyond the inner diameter of the first liner. The body member of the second ring member extends along the face of the second liner a second distance beyond the inner diameter of the second liner.

The first distance may be in the range of about 0.010 inches to about 0.020 inches and the second distance may be in the range of about 0.010 inches to about 0.020 inches. The corrosion barrier ring may include opposing indented ends having beveled portions and the second end of the first ring member and the first end of the second ring member may include registering beveled portions to cooperate with the opposing indented ends of the corrosion barrier ring. The beveled portions of the corrosion barrier ring, the second end of the first ring member, and the first end of the second ring member may be beveled at a 45° angle. The second end of the first ring member and the first end of the second ring member may be bonded adhesively to the opposing ends of the corrosion barrier ring. The first and second ring members may be made of glass reinforced epoxy. The corrosion barrier ring may be made of a compressible material.

Also provided is a coupling assembly that includes: a first pipe; a second pipe; a coupling member fixedly connecting the first pipe and the second pipe; a first ring member; a second ring member; a corrosion barrier ring; a first liner; and a second liner. The first ring member is positioned at a first end of the first pipe. The first ring member has a body member that includes a first end and a second end. The first end has a flange extending substantially perpendicularly therefrom. The second ring member is positioned adjacent to the coupling member. The second ring member includes a body member having a first end and a second end. The second end has a flange extending substantially perpendicularly therefrom. The corrosion barrier ring is disposed between and cooperating with the first end of the first ring member and the second end of the second ring member. The first liner is disposed in the first pipe. The first liner has an inner diameter and a face that is positioned in contact with the first end of the body member of the first ring member. The second liner is disposed in the second pipe. The second liner has an inner diameter and a face that is positioned in contact with the second end of the body member of the second ring member. The body member of the first ring member extends along the face of the first liner a first distance beyond the inner diameter of the first liner. The body member of the second ring member extends along the face of the second liner a second distance beyond the inner diameter of the second liner.

In addition, provided is a method of connecting two pipe segments. The method includes the steps of: providing a first pipe segment; providing a second pipe segment; inserting a first liner into the first pipe segment; inserting a second liner into the second pipe segment; providing a first ring member having a body member with a first end and a second end; and placing the first ring member in engagement with the first liner by positioning a face of the first liner in contact with the first end of the body member of the first ring member such that the flange of the first ring member extends along an outer diameter of the first liner. The first end of the first ring member has a flange extending substantially perpendicularly therefrom. The method also includes providing a second ring member comprising a body member having a first end and a second end; and placing the second ring member in engagement with the second liner by positioning a face of the second liner in contact with the second end of the body member of the second ring member such that the flange of the second ring member extends along an outer diameter of the first liner. The second end of the second ring member has a flange extending substantially perpendicularly therefrom. In addition, the method includes: interposing a corrosion barrier ring between the second end of the first ring member and the first end of the second ring member; providing a coupling member adapted to receive a second end of the first pipe segment and a first end of the second pipe segment therein; receiving a second end of the first pipe segment having the first liner disposed therein into the coupling member to fixedly join the first pipe segment with the coupling member; and receiving a first end of the second pipe segment having the second liner disposed therein into the coupling member to fixedly join the second pipe segment with the coupling member. The body member of the first ring member extends along the face of the first liner a first distance beyond an inner diameter of the first liner, and the body member of the second ring member extends along the face of the second liner a second distance beyond an inner diameter of the second liner.

These and other features and characteristics of the invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures.

DESCRIPTION OF THE INVENTION

Figure 1:
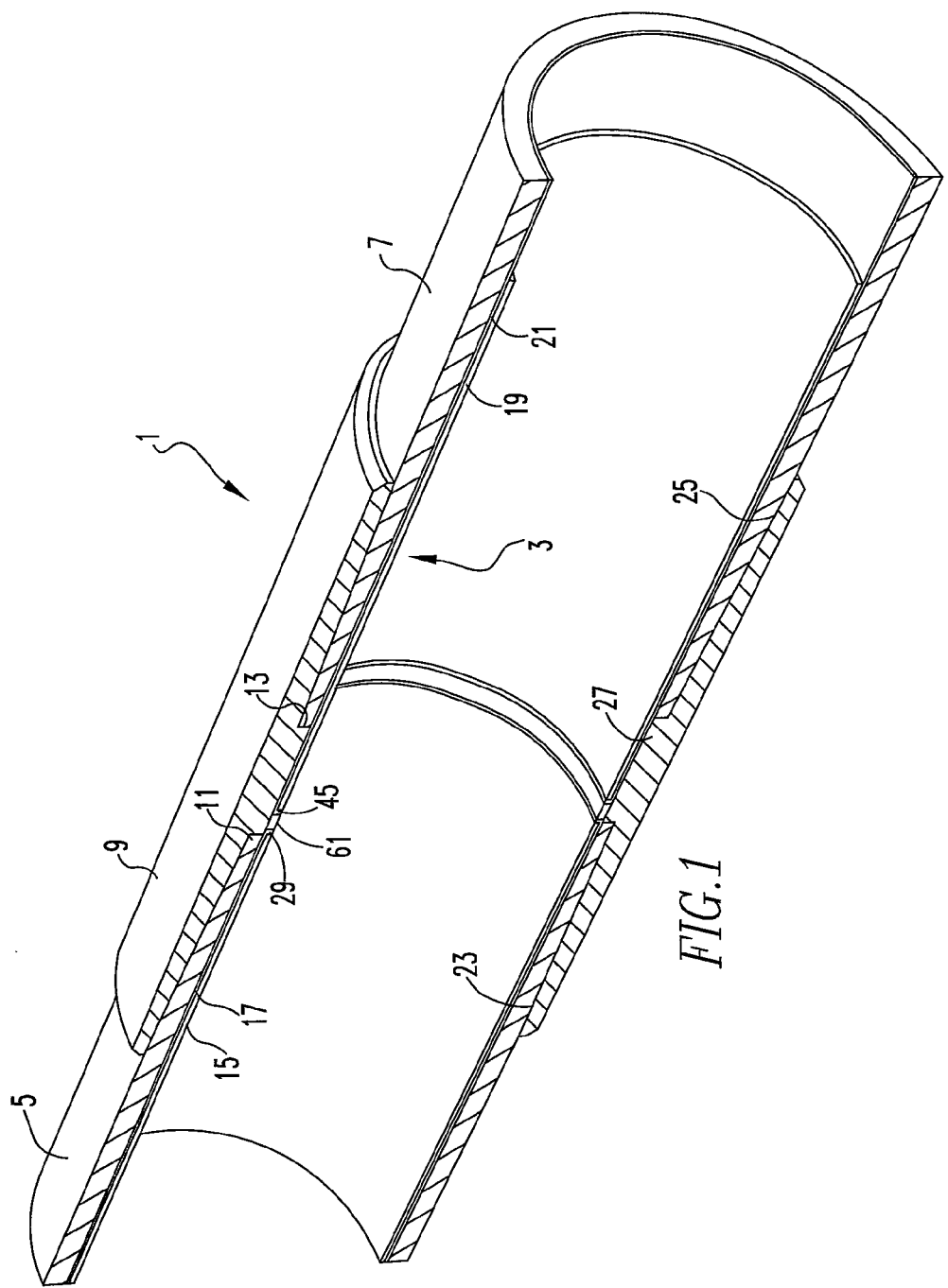
FIG. 1 is a cross-sectional perspective view of a pipe liner coupling assembly in accordance with the present invention.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention.

A conventional process of connecting pipes in the oil and gas industry utilizes steel threaded couplings, which are machined and threaded and adapted to accommodate an insert liner. The present invention relates generally to a coupling assembly, denoted generally as reference numeral 1, used to connect adjacent or opposing pipe segments, and a liner assembly, denoted generally as reference numeral 3, for use in coupling assembly 1. Coupling assembly 1 is adapted to connect internal liners of the liner assembly 3 as described in detail hereinafter.

Figure 2:
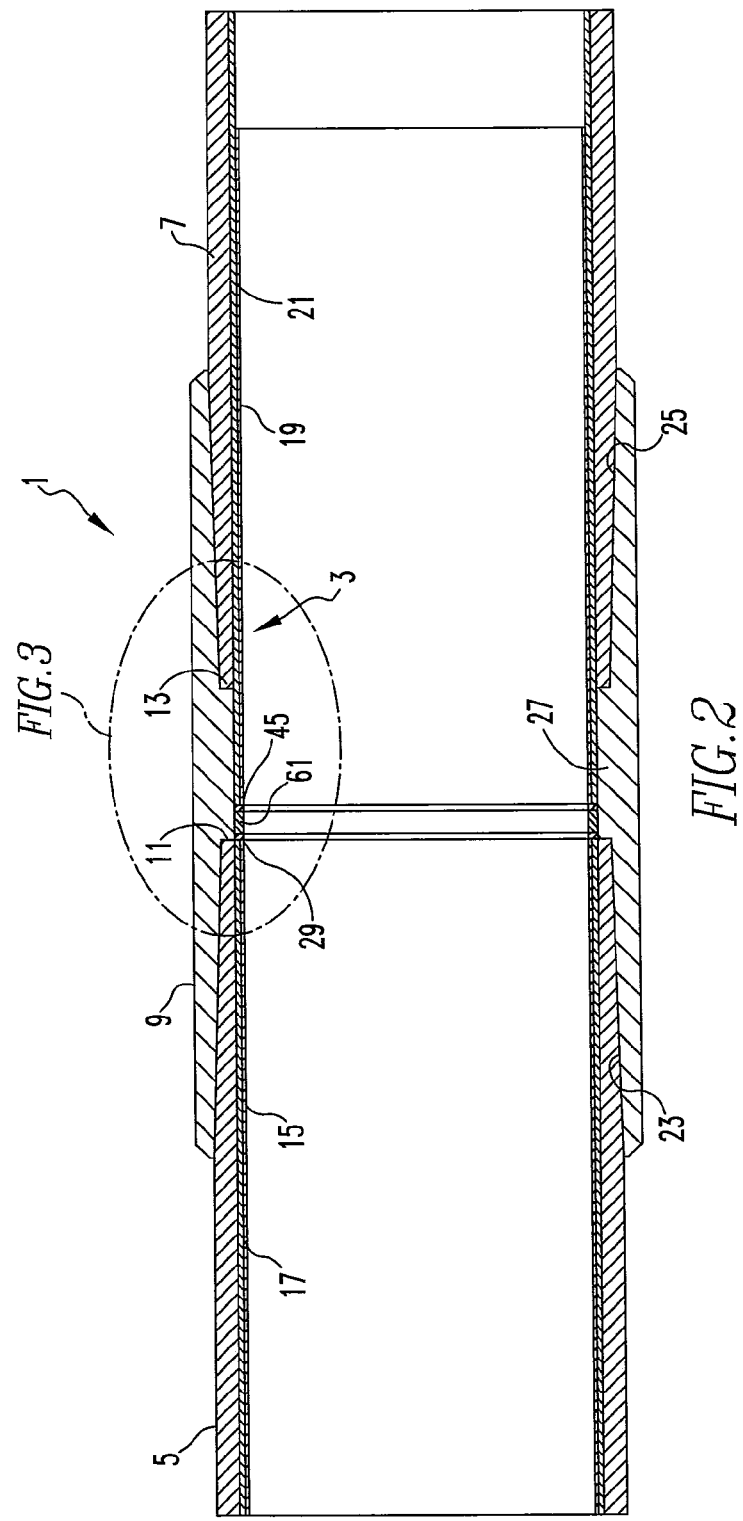
FIG. 2 is a cross-sectional side view of the pipe liner of FIG. 1.

With reference to FIGS. 1 and 2, coupling assembly 1 includes a first pipe segment 5, a second pipe segment 7, a coupling member 9 interconnecting first and second pipe segments 5, 7 and liner assembly 3 generally disposed within an area defined by coupling member 9. First pipe segment 5 has a second end 11 that is configured to be inserted into coupling member 9, and second pipe segment 7 has a first end 13 that is configured to be inserted into coupling member 9.

Liner assembly 3 includes a first liner 15 disposed in first pipe segment 5. First liner 15 is placed in the first pipe segment 5 and defines a first annular gap 17 with the inside surface of first pipe segment 5. First annular gap 17 is typically filled with mortar or grout as is known in the art. For oil and gas applications, the mortar or grout may be a mixture of oil well cements and oil well cement additives mixed with water to a controlled slurry viscosity. Liner assembly 3 further includes a second liner 19 disposed in the second pipe segment 7 that defines a second annular gap 21 with the inside surface of second pipe segment 7. Second annular gap 21 is also typically filled with mortar or grout as described above. First liner 15 and second liner 19 may be made of materials such as filament wound fiber reinforced thermosetting resin or extruded thermoplastic, and the like.

Second end 11 of first pipe segment 5 and first end 13 of second pipe segment 7 are connected together by coupling member 9 as described hereinabove. Coupling member 9 may be a steel threaded coupling having internal threads (not shown) provided in both ends thereof. In particular, the internal threads (not shown) may be provided at a first end 23 and a second end 25 of coupling member 9 and a central, unthreaded portion 27 is located between first end 23 and second end 25. The internal threads (not shown) located at first end 23 of coupling member 9 receive external threads (not shown) provided at second end 11 of first pipe segment 5 and internal threads (not shown) located at second end 25 of coupling member 9 receive external threads (not shown) of first end 13 of second pipe segment 7. Coupling member 9 may vary in shape and size for various applications. For example, first and second ends 23, 25 of coupling member 9 may be tapered to further ensure a tighter seal between first and second pipe segments 5, 7 and coupling member 9.

Figure 3:
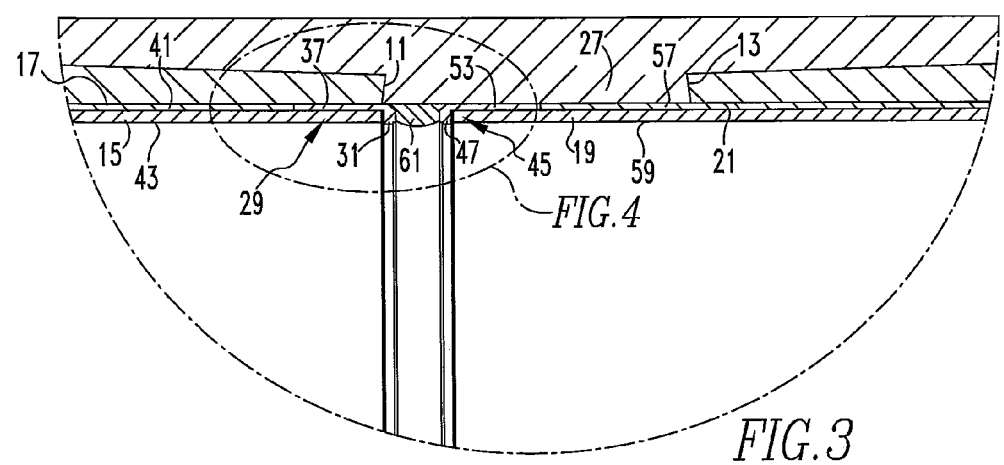
FIG. 3 is a portion of the cross-sectional view of FIG. 2 enlarged for magnification purposes.
Figure 4:
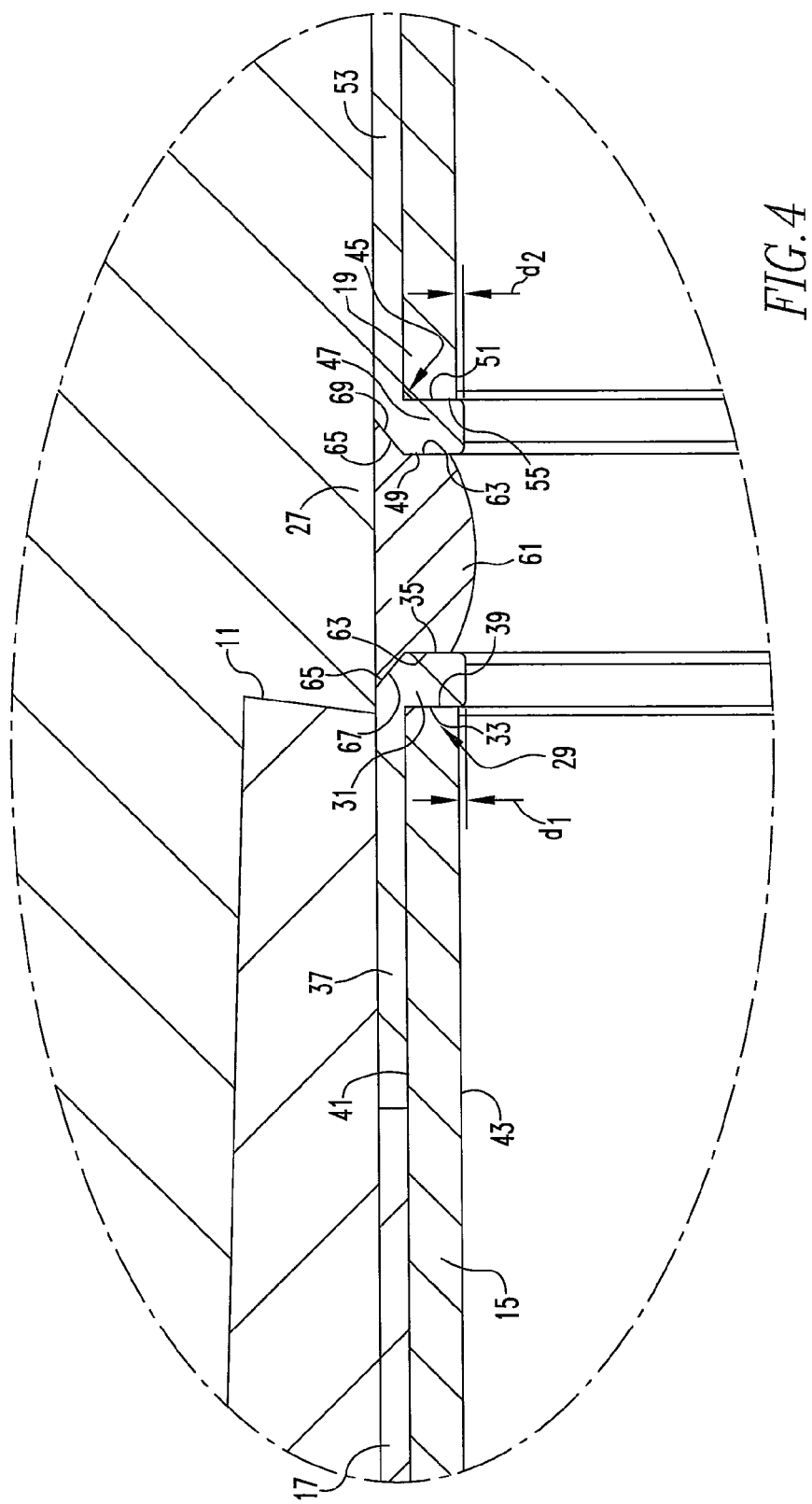
FIG. 4 is a portion of the cross-sectional view of FIG. 3 enlarged for magnification purposes.

With reference to FIGS. 3 and 4, and with continued reference to FIGS. 1 and 2, liner assembly 3 includes a first ring member 29 configured to engage first liner 15 at second end 11 of first pipe segment 5. First ring member 29 includes a body member 31 having a first end 33 and a second end 35. First end 33 has a flange 37 extending substantially perpendicularly therefrom. First ring member 29 is positioned in engagement with first liner 15 by positioning a face 39 of first liner 15 in contact with first end 33 of body member 31 of first ring member 29 such that flange 37 of first ring member 29 extends along an outer diameter 41 of first liner 15. Since flange 37 extends along outer diameter 41 of first liner 15 rather than along an inner diameter, as in many prior art systems, the inner diameter of the bore is maximized.

In addition, body member 31 of first ring member 29 extends along face 39 of first liner 15 a first distance $d_1$ beyond an inner diameter 43 of first liner 15. This first distance $d_1$ is desirably in the range of about 0.010 inches to about 0.020 inches. Desirably, the first distance $d_1$ is 0.015 inches. By having body member 31 extending first distance $d_1$ beyond inner diameter 43 of first liner 15, protection is provided to face 39 of first liner 15 to minimize "fiberglass stringers" (i.e., dislodged fiberglass strands along inner diameter 43 of first liner 15). Protecting against such fiberglass strands provides product performance reliance.

First ring member 29 may be made of molded fiber reinforced resin and the like. First ring member 29 may also be adhered or bonded to first liner 15 with an adhesive or first liner 15 may be friction fit against body member 31 of first ring member 29.

With continued reference to FIGS. 3 and 4, liner assembly 3 also includes a second ring member 45 configured to engage second liner 19 at first end 13 of second pipe segment 7. Second ring member 45 is essentially a mirror image of first ring member 29. More specifically, second ring member 45 includes a body member 47 having a first end 49 and a second end 51. Second end 51 has a flange 53 extending substantially perpendicularly therefrom. Second ring member 45 is positioned in engagement with second liner 19 by positioning a face 55 of second liner 19 in contact with second end 51 of body member 47 of second ring member 45 such that flange 53 of second ring member 45 extends along an outer diameter 57 of second liner 19.

In addition, body member 47 of second ring member 45 extends along face 55 of second liner 19 a second distance $d_2$ beyond an inner diameter 59 of second liner 19. This second distance $d_2$ is in the range of about 0.010 inches to about 0.020 inches. Desirably, the second distance $d_2$ is 0.015 inches, and the same as first distance $d_1$. By having body member 47 extending second distance $d_2$ beyond inner diameter 59 of second liner 19, protection is provided to face 55 of second liner 19 as discussed in greater detail hereinabove.

Second ring member 45 may be made of molded fiber reinforced resin and the like. Second ring member 45 may also be adhered or bonded to second liner 19 with an adhesive or second liner 19 may be friction fit against body member 47 of second ring member 45.

With continued reference to FIGS. 3 and 4, liner assembly 3 also includes a corrosion barrier ring 61 disposed between first and second ring members 29, 45. Corrosion barrier ring 61 may be made of a compressible material and the like. Corrosion barrier ring 61 defines opposing indented ends 63. Opposing indented ends 63 include beveled portions 65.

Opposing indented ends 63 of corrosion barrier ring 61 cooperate with first ring member 29 and second ring member 45. More particularly, opposing indented ends 63 cooperate with second end 35 of body member 31 of first ring member 29 and first end 49 of body member 47 of second ring member 45. More specifically, second end 35 of body member 31 of first ring member 31 includes a beveled portion 67 and first end 49 of body member 47 of second ring member 45 includes a beveled portion 69. Beveled portion 67 of second end 35 of body member 31 of first ring member 29 and beveled portion 69 of first end 49 of body member 47 of second ring member 45 are adapted to register with beveled portions 65 of corrosion barrier ring 61. The cooperation between opposing indented ends 63 with second end 35 of body member 31 of first ring member 29 on one side and first end 49 of body member 47 of second ring member 45 on the opposite side ensures integrity of the sealing fit of liner assembly 3.

Beveled portions 65 of corrosion barrier ring 61 may be beveled at 45° angles. Additionally, beveled portion 67 at second end 35 of body member 31 of first ring member 29 and beveled portion 69 at first end 49 of body member 47 of second ring member 45 may also be beveled at 45° angles. When placed adjacent to one end of corrosion barrier ring 61, the 45° angle of beveled portion 67 at second end 35 of body member 31 of first ring member 29 complements the 45° angle of beveled portion 65 of corrosion barrier ring 61 to seal and join corrosion barrier ring 61 and first ring member 29 together. Similarly, when placed adjacent the opposite end of corrosion barrier ring 61, the 45° angle defined by beveled portion 69 at first end 49 of body member 47 of second ring member 45 complements the 45° angle of beveled portion 65 of corrosion barrier ring 61 to seal and join corrosion barrier ring 61 and second ring member 45 together. Additionally, second end 35 of body member 31 of first ring member 29 and first end 49 of body member 47 of second ring member 45 may be bonded adhesively to opposing ends 63 of corrosion barrier ring 61.

While beveled portions 65 of corrosion barrier ring 61 have been discussed herein as having a 45° angle, this is not to be construed as limiting the present invention as beveled portions 65 of corrosion barrier ring 61 may be of any shape or size, so long as first ring member 29 and second ring member 45 have registering (i.e., corresponding) beveled portions 67, 69, respectively. Some additional examples are described in U.S. Pat. No. 7,360,797, assigned to the assignee of the present application, the disclosure of which is incorporated herein by reference.

The present invention is also directed to a method of connecting two pipe segments. Initially, first pipe or pipe segment 5 and second pipe or pipe segment 7 are provided. First liner 15 is inserted into first pipe 5 and second liner 19 is inserted into second pipe 7. First ring member 29 is placed in engagement with first liner 15. Second ring member 45 is placed in engagement with second liner 19 as described hereinabove. Thereafter, corrosion barrier ring 61 is interposed between second end 35 of body member 31 of first ring member 29 and first end 49 of body member 47 of second ring member 45 in the manner discussed previously. Opposing indented ends 63 of corrosion barrier ring 61 cooperate with second end 35 of body member 31 of first ring member 29 and first end 49 of body member 47 of second ring member 45, respectively. Second end 35 of body member 31 of first ring member 29 and first end 49 of body member 47 of second ring member 45 define corresponding registering shapes to cooperate with opposing indented ends 63 of corrosion barrier ring 61.

The method also includes the step of fixedly joining first and second pipe segments 5, 7 with external coupling member 9 extending between first and second pipe segments 5, 7, respectively. Coupling member 9 is adapted to receive ends 11, 13 of the first and second pipe segments 5, 7. First pipe segment 5 is received into coupling member 9 by engaging the external threads (not shown) of first pipe segment 5 with the internal threads (not shown) of coupling member 9. First pipe segment 5 has first liner 15 disposed therein with first ring member 29 secured to first liner 15.

Typically, coupling member 9 is engaged with second end 11 of first pipe segment 5 including first liner 15 and first ring member 29 prior to installation, for example, in an oil or gas well. Corrosion barrier ring 61 is then installed in coupling member 9 such that beveled portion 65 engages with beveled portion 67 at second end 35 of body member 31 of first ring member 29. Once corrosion barrier ring 61 is installed in coupling member 9, second pipe segment 7 is threaded or otherwise positioned into coupling member 9 such that beveled portion 65 on the opposing end of corrosion barrier ring 61 engages with beveled portion 69 of first end 49 of second ring member 45.

Corrosion barrier ring 61 is then compressed between second end 35 of body member 31 of first ring member 29 and first end 49 of body member 47 of second ring member 45 as second pipe segment 7 is rotated into engagement with coupling member 9, which fixedly joins first and second pipe segments 5, 7 together. Unthreaded portion 27 of coupling member 9 functions to absorb the concentrated stresses so as to allow corrosion barrier ring 61 to be compressed between first ring member 29 and second ring member 45.

Compressed corrosion barrier ring 61 acts to prevent fluids passing through the joined pipe segments 5, 7 from causing coupling member 9 to fail due to internal corrosion. Liners 15, 19 function to energize or compress corrosion barrier ring 61 inside the connection between first and second pipe segments 5, 7 to provide continuous corrosion protection not only inside lined pipes or casing joints generally, but also through coupling member 9. Corrosion barrier ring 61 undergoes further compression between second end 35 of body member 31 of first ring member 29 and first end 49 of body member 47 of second ring member 45 as new pipe is added to the pipe string.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements. Furthermore, it is to be understood that the present invention contemplates that, to the extent possible, one or more features of any embodiment can be combined with one or more features of any other embodiment.

The invention claimed is:

1. A liner assembly for use in a joint between two pipe segments, comprising:
   a first ring member comprising a body member having a first end and a second end, the first end having a flange extending substantially perpendicularly therefrom,
   a second ring member comprising a body member having a first end and a second end, the second end having a flange extending substantially perpendicularly therefrom;
   a corrosion barrier ring disposed between and cooperating with the first end of the first ring member and the second end of the second ring member;
   a first liner having an inner diameter and an end face that is positioned in contact with the first end of the body member of the first ring member; and
   a second liner having an inner diameter and an end face that is positioned in contact with the second end of the body member of the second ring member,
   wherein the first end of the body member of the first ring member extends along the end face of the first liner a first distance beyond the inner diameter of the first liner such that at least a portion of the first end of the body member of the first ring member is not in contact with the end face of the first liner, and
   the second end of the body member of the second ring member extends along the end face of the second liner a second distance beyond the inner diameter of the second liner such that at least a portion of the second end of the body member of the second ring member is not in contact with the end face of the second liner.

2. The liner assembly of claim 1, wherein the first distance is in the range of about 0.010 inches to about 0.020 inches and the second distance is in the range of about 0.010 inches to about 0.020 inches.

3. The liner assembly of claim 1, wherein the corrosion barrier ring includes opposing indented ends comprised of beveled portions and the second end of the first ring member and the first end of the second ring member comprise registering beveled portions to cooperate with the opposing indented ends of the corrosion barrier ring.

4. The liner assembly of claim 3, wherein the beveled portions of the corrosion barrier ring, the second end of the first ring member, and the first end of the second ring member are beveled at a 45° angle.

5. The liner assembly of claim 3, wherein the second end of the first ring member and the first end of the second ring member are bonded adhesively to the opposing ends of the corrosion barrier ring.

6. The liner assembly of claim 1, wherein the first and second ring members are made of glass reinforced epoxy.

7. The liner assembly of claim 1, wherein the corrosion barrier ring is made of a compressible material.

8. A coupling assembly comprising:
   a first pipe;
   a second pipe;
   a coupling member fixedly connecting the first pipe and the second pipe;
   a first ring member positioned at a first end of the first pipe, the first ring member comprising a body member having a first end and a second end, the first end having a flange extending substantially perpendicularly therefrom;
   a second ring member positioned adjacent to the coupling member, the second ring member comprising a body member having a first end and a second end, the second end having a flange extending substantially perpendicularly therefrom;
   a corrosion barrier ring disposed between and cooperating with the first end of the first ring member and the second end of the second ring member;
   a first liner disposed in the first pipe, the first liner having an inner diameter and an end face that is positioned in contact with the first end of the body member of the first ring member; and
   a second liner disposed in the second pipe, the second liner having an inner diameter and an end face that is positioned in contact with the second end of the body member of the second ring member,
   wherein the first end of the body member of the first ring member extends along the end face of the first liner a first distance beyond the inner diameter of the first liner such that at least a portion of the first end of the body member of the first ring member is not in contact with the end face of the first liner, and
   the second end of the body member of the second ring member extends along the end face of the second liner a second distance beyond the inner diameter of the second liner such that at least a portion of the second end of the body member of the second ring member is not in contact with the end face of the second liner.

9. The coupling assembly of claim 8, wherein the first distance is in the range of about 0.010 inches to about 0.020 inches and the second distance is in the range of about 0.010 inches to about 0.020 inches.

10. The coupling assembly of claim 8, wherein the corrosion barrier ring includes opposing indented ends comprised of beveled portions and the second end of the first ring member and the first end of the second ring member comprise registering beveled portions to cooperate with the opposing indented ends of the corrosion barrier ring.

11. The coupling assembly of claim 10, wherein the beveled portions of the corrosion barrier ring, the second end of the first ring member, and the first end of the second ring member are beveled at a 45° angle.

12. The coupling assembly of claim 10, wherein the second end of the first ring member and the first end of the second ring member are bonded adhesively to the opposing ends of the corrosion barrier ring.

13. The coupling assembly of claim 8, wherein the first and second ring members are made of glass reinforced epoxy.

14. The coupling assembly of claim 8, wherein the corrosion barrier ring is made of a compressible material.

15. A method of connecting two pipe segments, comprising the steps of:
providing a first pipe segment;
providing a second pipe segment;
inserting a first liner into the first pipe segment;
inserting a second liner into the second pipe segment;
providing a first ring member comprising a body member having a first end and a second end, the first end having a flange extending substantially perpendicularly therefrom;
placing the first ring member in engagement with the first liner by positioning an end face of the first liner in contact with the first end of the body member of the first ring member such that the flange of the first ring member extends along an outer diameter of the first liner;
providing a second ring member comprising a body member having a first end and a second end, the second end having a flange extending substantially perpendicularly therefrom;
placing the second ring member in engagement with the second liner by positioning an end face of the second liner in contact with the second end of the body member of the second ring member such that the flange of the second ring member extends along an outer diameter of the first liner;
interposing a corrosion barrier ring between the second end of the first ring member and the first end of the second ring member;
providing a coupling member adapted to receive a second end of the first pipe segment and a first end of the second pipe segment therein;
receiving a second end of the first pipe segment having the first liner disposed therein into the coupling member to fixedly join the first pipe segment with the coupling member; and
receiving a first end of the second pipe segment having the second liner disposed therein into the coupling member to fixedly join the second pipe segment with the coupling member,
wherein the first end of the body member of the first ring member extends along the end face of the first liner a first distance beyond an inner diameter of the first liner such that at least a portion of the first end of the body member of the first ring member is not in contact with the end face of the first liner, and
the second end of the body member of the second ring member extends along the end face of the second liner a second distance beyond an inner diameter of the second liner such that at least a portion of the second end of the body member of the second ring member is not in contact with the end face of the second liner.

16. The method of claim 15, wherein the first distance is in the range of about 0.010 inches to about 0.020 inches and the second distance is in the range of about 0.010 inches to about 0.020 inches.

17. The method of claim 15, wherein the corrosion barrier ring includes opposing indented ends comprised of beveled portions and the second end of the first ring member and the first end of the second ring member comprise registering beveled portions to cooperate with the opposing indented ends of the corrosion barrier ring.

18. The method of claim 17, wherein the beveled portions of the corrosion barrier ring, the second end of the first ring member, and the first end of the second ring member are beveled at a 45° angle.

19. The method of claim 17, wherein the second end of the first ring member and the first end of the second ring member are bonded adhesively to the opposing ends of the corrosion barrier ring.

20. The method of claim 15, wherein the first and second ring members are made of glass reinforced epoxy.

* * * * *